United States Patent
Betts et al.

(10) Patent No.: US 9,522,313 B2
(45) Date of Patent: Dec. 20, 2016

(54) COUNTERBALANCED PUTTERS

(71) Applicant: Taylor Made Golf Company, Inc., Carlsbad, CA (US)

(72) Inventors: Kassie Terra-Lynn Betts, Carlsbad, CA (US); Peter L. Larsen, San Marcos, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 108 days.

(21) Appl. No.: 14/579,805

(22) Filed: Dec. 22, 2014

(65) Prior Publication Data

US 2016/0175667 A1    Jun. 23, 2016

(51) Int. Cl.
| | |
|---|---|
| A63B 53/00 | (2015.01) |
| A63B 53/04 | (2015.01) |
| A63B 59/00 | (2015.01) |
| A63B 53/10 | (2015.01) |
| G06F 19/00 | (2011.01) |
| G06K 9/00 | (2006.01) |

(52) U.S. Cl.
CPC ......... *A63B 53/0487* (2013.01); *A63B 53/007* (2013.01); *A63B 53/10* (2013.01); *A63B 59/0033* (2013.01); *A63B 60/24* (2015.10); *G06F 19/3481* (2013.01); *G06K 9/00342* (2013.01); *A63B 2053/0491* (2013.01); *A63B 2209/00* (2013.01)

(58) Field of Classification Search
CPC .............. A63B 53/0487; A63B 53/007; A63B 59/0033; A63B 2053/0491; A63B 53/10; A63B 2209/00; A63B 60/24; G06F 19/3481; G06K 9/00342
See application file for complete search history.

(56) References Cited

U.S. PATENT DOCUMENTS

| | | | | |
|---|---|---|---|---|
| 3,606,327 | A * | 9/1971 | Gorman | A63B 53/04 473/297 |
| 4,461,479 | A * | 7/1984 | Mitchell | A63B 60/24 473/292 |
| 5,152,527 | A | 10/1992 | Mather | |
| 5,228,688 | A | 7/1993 | Davis | |

(Continued)

FOREIGN PATENT DOCUMENTS

JP         2005304896 A  *  11/2005

*Primary Examiner* — Stephen Blau
(74) *Attorney, Agent, or Firm* — Klarquist Sparkman, LLP (57) ABSTRACT

Described are embodiments of putters that include a counterbalance weight located at the butt end of the shaft. The shaft and/or grip of disclosed putters can have reduced mass while the putter head and the butt of the shaft can have increased mass compared to conventional putters, which provides a similar overall total mass but with an increase in the moment of inertia (MOI). The increase in MOI compared to a conventional putter of similar style and mass can provide increased swing stability during a stroke, decreasing unintentional waggling about the hand grip fulcrum. The added weight in the putter head and the added weight in the butt of the putter can counterbalance each other so that the overall swingweight of the putter can be about the same as for a conventional, non-counterbalanced putter having the same total mass, thereby providing a familiar feel and easy playability.

20 Claims, 6 Drawing Sheets

(56) References Cited

U.S. PATENT DOCUMENTS

| | | | | |
|---|---|---|---|---|
| 5,277,059 A * | 1/1994 | Chastonay | A63B 60/42 | 473/292 |
| 5,467,984 A * | 11/1995 | Veux | A63B 53/00 | 473/287 |
| 5,879,241 A | 3/1999 | Cook et al. | | |
| 6,135,896 A | 10/2000 | Miao et al. | | |
| 6,364,787 B1 | 4/2002 | Huiskamp | | |
| 6,506,128 B1 * | 1/2003 | Bloom, Jr. | A63B 53/007 | 473/292 |
| 7,371,187 B2 * | 5/2008 | Moriyama | A63B 53/0487 | 473/313 |
| 7,485,048 B2 * | 2/2009 | Nilsson | A63B 53/0487 | 473/256 |
| 7,677,987 B2 * | 3/2010 | Hilton | A63B 53/0487 | 473/242 |
| 8,157,669 B2 * | 4/2012 | Hulock | A63B 53/10 | 473/316 |
| 8,328,654 B2 * | 12/2012 | Demkowski | A63B 53/0487 | 473/248 |
| 8,419,564 B1 | 4/2013 | Solheim et al. | | |
| 8,715,101 B2 * | 5/2014 | Naruo | A63B 53/047 | 473/292 |
| 2002/0142855 A1 * | 10/2002 | Cook | A63B 53/10 | 473/282 |
| 2002/0173377 A1 * | 11/2002 | Sindelar | A63B 53/007 | 473/340 |
| 2003/0157990 A1 | 8/2003 | Bloom, Jr. | | |
| 2006/0019765 A1 * | 1/2006 | Plutt | A63B 53/007 | 473/297 |
| 2008/0009363 A1 * | 1/2008 | Solodovnick | A63B 60/24 | 473/297 |
| 2008/0081708 A1 | 4/2008 | Wilmsen et al. | | |
| 2010/0081515 A1 | 4/2010 | White et al. | | |
| 2013/0165249 A1 | 6/2013 | Margoles et al. | | |
| 2014/0100054 A1 * | 4/2014 | Parente | A63B 53/007 | 473/292 |
| 2014/0148267 A1 * | 5/2014 | Pitbladdo | A63B 53/00 | 473/292 |
| 2015/0018114 A1 * | 1/2015 | Stokke | A63B 53/10 | 473/287 |
| 2016/0074718 A1 * | 3/2016 | Nakamura | A63B 53/00 | 473/292 |

\* cited by examiner

COUNTERBALANCED PUTTERS

FIELD

This application relates to golf clubs, and more particularly to putters.

BACKGROUND

Golf is a game in which a player, choosing from a variety of different golf clubs, seeks to hit a ball into each hole on the golf course in the fewest possible strokes. A putter is one type of golf club, and is designed for use on a putting green for shots that are close to the cup. Putters are used when a great deal of accuracy and precision are required. When swinging a putter, it is desirable to maintain a smooth, stable stroke to provide optimal accuracy and precision.

SUMMARY

Described below are embodiments of putters and other golf clubs that are counterbalanced with significant mass located near the butt of the shaft above the grip location. The shaft and/or grip of disclosed putters can have reduced mass while the putter head and the butt of the shaft can have increased mass compared to an analogous conventional putter, which provides a similar overall total mass but with an increase in the moment of inertia (MOI) of the putter about the center of gravity (CG) and/or about a hand grip fulcrum location. The increase in MOI compared to a conventional putter of similar style and mass can provide increased swing stability during a stroke, decreasing unintentional waggling about the hand grip fulcrum, and thus providing increased accuracy and precision to putts. At the same time, the added weight in the putter head and the added weight in the butt of the putter can counterbalance each other in such a way that the overall swingweight of the putter can be about the same as for a conventional, non-counterbalanced putter having the same total mass, thereby providing a familiar feel and sensation during a putting stroke that makes the disclosed counterbalanced putters readily playable in place of a conventional putter of similar style.

The foregoing and other objects, features, and advantages of the disclosed technology will become more apparent from the following detailed description, which proceeds with reference to the accompanying figures.

DETAILED DESCRIPTION

Disclosed herein are embodiments of putters and other golf clubs that are counterbalanced with a counterbalance weight located at or near the upper end or "butt end" of the club above the gripping location. The shaft and grip of disclosed putters can have reduced mass while the putter head and the butt end of the shaft have increased mass compared to a conventional putter. Such putters can have a similar overall total mass as compared to a conventional putter of similar style, but with an increase in the moment of inertia (MOI) of the putter about the CG and about the hand grip fulcrum location (e.g., where the putter pivots when a golfer rotates his hands). The increase in MOI can provide increased swing stability during a putting stroke, decreasing unintentional waggling about the hand grip fulcrum, and thus providing increased accuracy and precision to putts. At the same time, the added weight in the putter head and the added weight in the butt end of the putter can counterbalance each other in such a way that the overall swingweight of the putter (e.g., rotational moment about the hand grip fulcrum location due to gravity) can be about the same as for a conventional, non-counterbalanced putter having the same total mass. Having the same or similar swingweight can provide the golfer a familiar feel and sensation during a putting stroke that makes the disclosed putters readily playable in place of a conventional putter without having to adjust one's putting stroke.

Club Length Dimensions

Figure 1:
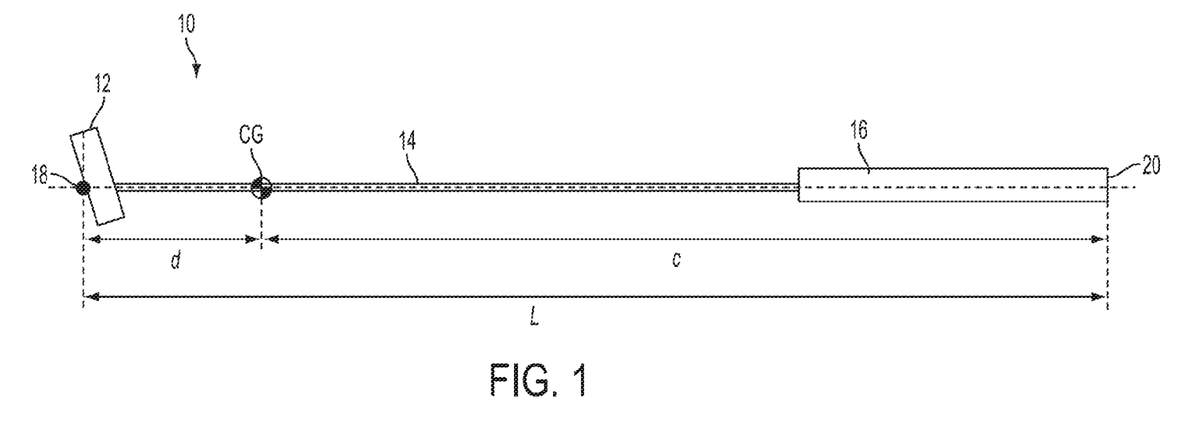
FIGS. 1 and 2 show two exemplary putters and illustrate certain features and dimensions of putters that are described herein.
Figure 2:
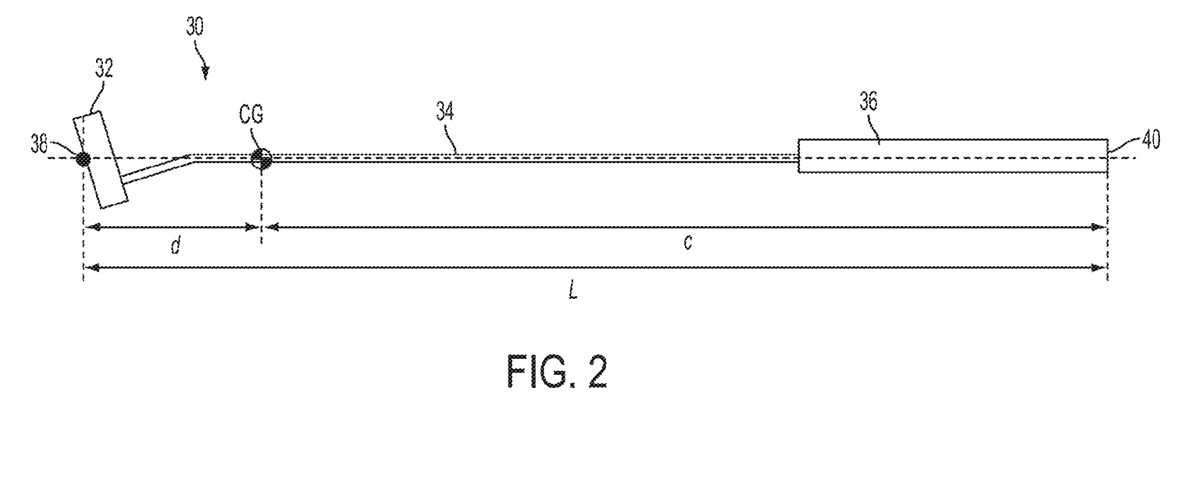

FIGS. 1 and 2 show two different types of putters and illustrate an exemplary methodology for measuring club length dimensions of a putter based on the center of gravity (CG) and the shaft axis of the putter. Putter 10 in FIG. 1 has a straight shaft 14 that couples its grip 16 to its head 12, while putter 30 in FIG. 2 has a bent shaft 34 that couples its grip 36 to its head 32. In the example of the putter 10 with a straight shaft 14, the overall shaft length (L) of the putter can be measured from a point 18 where the shaft center axis intersects the bottom/sole of the head 12 to the butt end 20 of the club. In the example of the putter 30 with a bent shaft 34, the shaft center axis can be defined based the longer upper portion of the shaft and disregarding the shorter lower portion of the shaft. Then, the overall shaft length (L) of the putter 30 can be measured from a point 38 where the shaft center axis intersects the bottom/sole of the head 32 to the butt end 40 of the club. For either putter type 10 or 30, a dimension "d" can be defined as the distance from the CG to the lower shaft axis intersection point 18 or 38 and a dimension "c" can be defined as the distance from the CG to the butt end 20 or 40 of the club.

Club Swingweight

Figure 3:
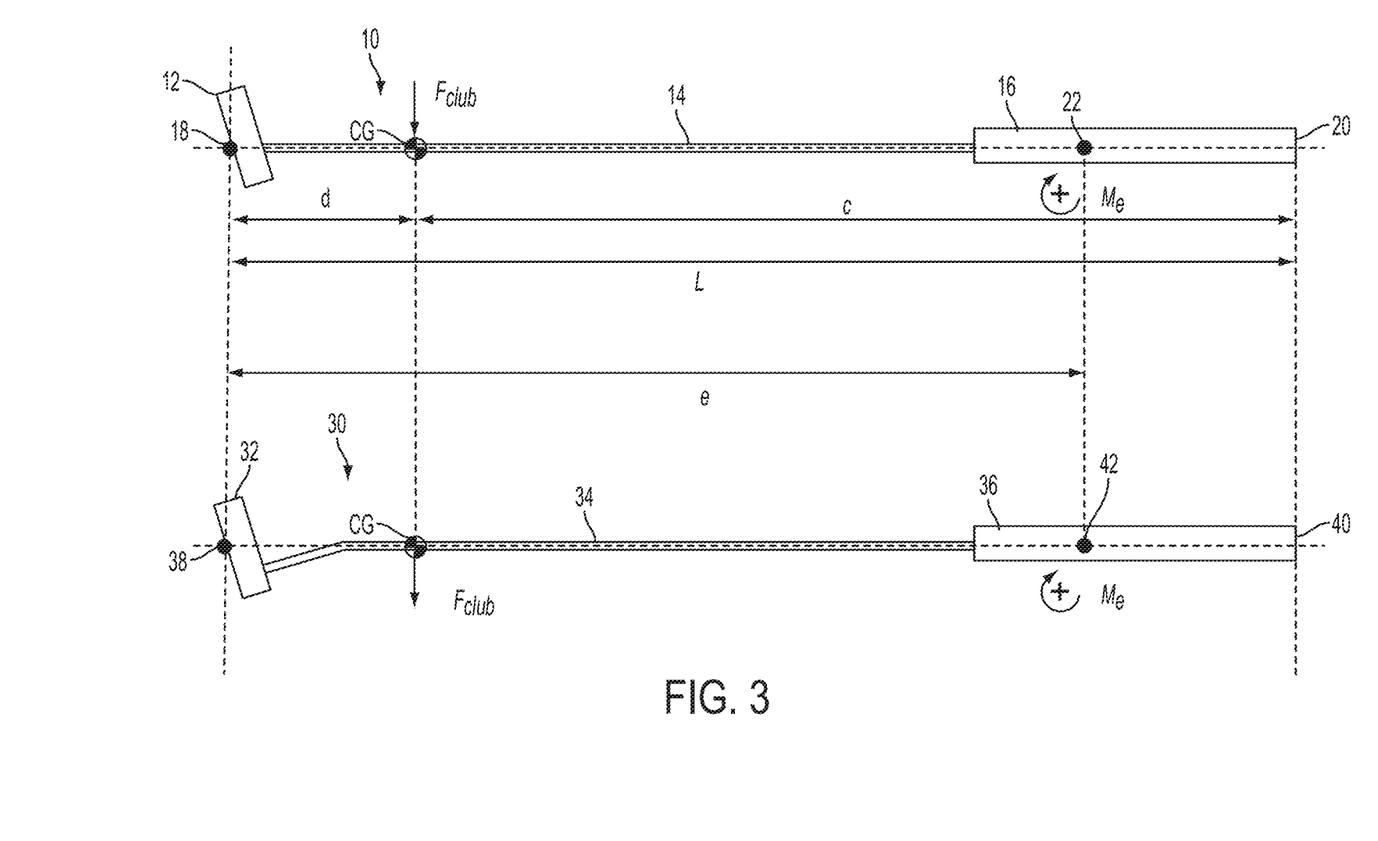
FIG. 3 shows the two putters of FIGS. 1 and 2, and illustrates a method of measuring the swingweight of putters.

FIG. 3 again shows the two putter types 10 and 30 and illustrates a methodology for calculating the swingweight of a club. For the putter 10, a hand grip fulcrum point 22 is defined and for the putter 30, a hand grip fulcrum point 42 is defined. Points 22 and 42 are approximations of the pivot point about which a putter pivots when a golfer holding the putter rotates his hands. The fulcrum points 22 and 42 can be defined as being a predetermined distance "e" from the lower shaft axis intersection point 18 or 38 along the shaft axis. For example, the distance "e" can be defined as 30 inches. The swingweight of the club can then be defined as the moment about the fulcrum point 22 or 42 caused by gravity when the club is horizontal and fixed at the fulcrum point. This swingweight moment "$M_e$" can be calculated as the product of the gravitational force "$F_{club}$" multiplied by the distance from the CG to the fulcrum point 22 or 42, which is equal to the distance "e" minus the distance "d". $F_{club}$ is equal to the total mass "m" of the club multiplied by the gravitational constant "g". Thus, $M_e=(e-d)*m*g$. Accordingly, changing the total mass of a club and/or shifting the location of the CG along the shaft axis (changing the distance "d") can change the swingweight of the club and cause the club to feel different when held and during a putting stroke. Thus, it can be desirable to provide a putter that maintains a similar swingweight compared to conventional putters such that a golfer is provided with a familiar feel and sensation when switching to a new putter. Furthermore, it can be desirable to provide a putter that maintains a similar total mass compared to conventional putters such that a golfer is provided with a familiar overall club weight when switching to a new putter.

Club MOI

The moment of inertia (MOI) of a putter or other club can be determined based on a selected axis. The MOI about a given axis provides a measure of the club's inertial resistance to rotating about that axis. For example, the MOI of the putter 10 about an axis extending perpendicular to the shaft axis, perpendicular to the page in FIG. 3, and passing through the CG of the putter is referred to as the "$MOI_{CG}$" of the putter 10. An alternative measurement of MOI about the CG can be measured about an axis extending perpendicular to the shaft axis, in the plane of FIG. 3, and passing through the CG of the putter. These two measurements of the MOI about the CG can be substantially equal. In addition, the MOI of the putter about an axis extending perpendicular to the shaft axis and passing through the grip fulcrum point 22, perpendicular to the page in FIG. 3, referred to as the "$MOI_e$" of the putter. An alternative measurement of MOI about the grip fulcrum point 22 can be measured about an axis extending perpendicular to the shaft axis, in the plane of FIG. 3, and passing through the grip fulcrum point. These two measurements of the MOI about the grip fulcrum point can be substantially equal.

Calculating the true MOI of a club about any axis can be difficult. One method of calculating the MOI of a club about a selected axis is by measuring the undamped period of oscillation of the club while it is fixed to a torsional spring of a testing machine at a point where the selected axis intersects the shaft axis, with the torsional spring being aligned with the selected axis. The overall MOI of the system (club plus torsional spring fixture) can then be calculated using the formula $MOI=(k*T^2)/(4\pi^2)$, where "k" is the coefficient of the torsional spring, and T is the undamped period of oscillation of the whole system. The MOI of the club about the selected axis is then equal to the overall MOI of the system minus the MOI of the torsional spring fixture by itself. Thus, the MOI of the club about the selected axis can be calculated as $MOI_{club}=(k/4\pi^2)*(T^2-(T_{fixt})^2)$, where "$T_{fixt}$" is the period of oscillation of the torsional spring fixture by itself without a club fixed to it. $T_{fixt}$ can be a known value for a given MOI testing system. Using such a testing system and method, the MOI of the club about any axis intersecting the shaft can be calculated, such as the $MOI_{CG}$ or the $MOI_e$.

Figure 4:
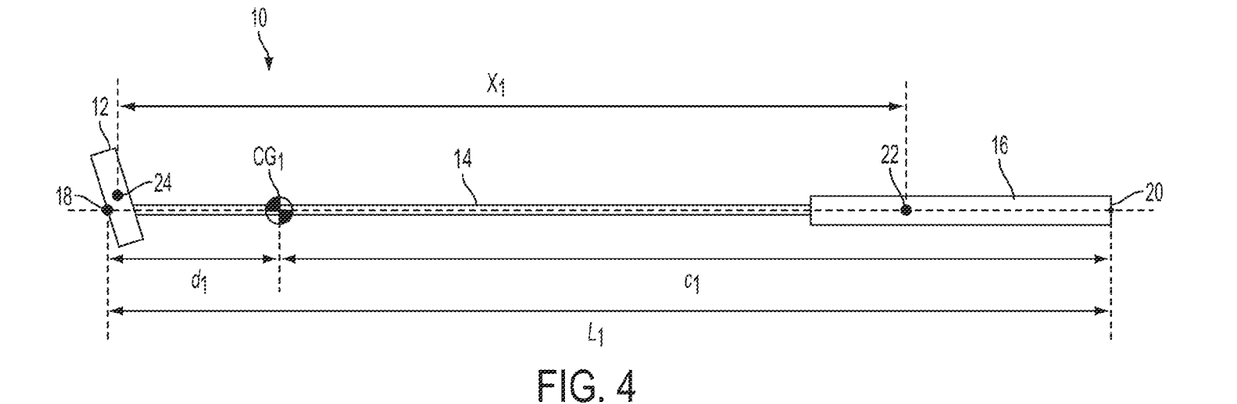
FIG. 4 shows the putter of FIG. 1, and further illustrates certain features and dimensions of the putter.

MOI values for a putter can also be approximated as a way of illustrating how adding mass to the butt end of the shaft of a putter can increase the MOI of the putter about the CG and about the grip fulcrum point. For example, MOI values can be approximated for a conventional putter by assuming that the mass of the shaft and grip are negligible and representing the putter head as a point mass at the center of the head. The MOI about a given axis perpendicular to and intersecting the shaft axis can then be approximated as the mass of the putter head multiplied by the square of the distance from the center of the head to the given axis. This is illustrated in FIG. 4 for the putter 10. The putter head 12 has a center 24 (e.g., CG of the head or geometric center of the head, etc.) and the distance from the center 24 to the grip fulcrum point 22 is shown as "$X_1$", such that the $MOI_e$ of the putter 10 about the grip fulcrum axis can be approximated as the mass "$N_1$" of the head 12 multiplied by the square of the distance "$X_1$", or $N_1*X_1^2$. As described below, adding a counterbalance weight at the butt end of a putter increases the MOI relative to convention putter without a counterbalance weight.

Exemplary Counterbalanced Putters

Figure 5:
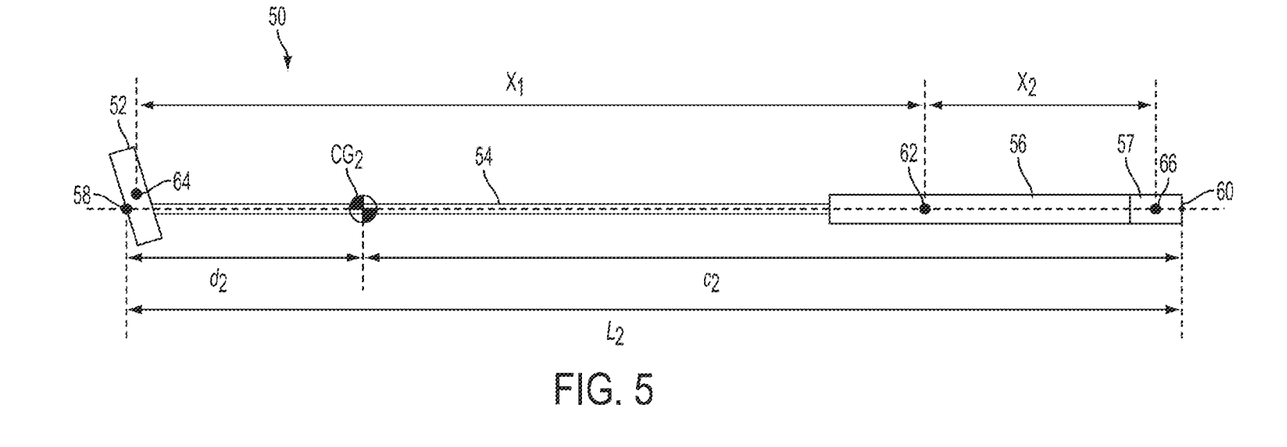
FIG. 5 shows an exemplary putter having a counterbalance weight positioned at the butt end of the shaft, and illustrates certain features and dimensions of the putter.

FIG. 5 shows an exemplary counterbalanced putter 50 that comprises a head 52, a shaft 54, a grip 56, and a counterbalance weight 57 at or near the butt end of the putter. The overall length "$L_2$" of the putter 50 is measured from the lower shaft axis intersection point 58 to the butt end 60 of the putter, which can be the end of the counterbalance weight 57. The $MOI_e$ of the putter 50 about an axis perpendicular to the grip fulcrum point 62 and intersecting the shaft axis can be increased due the presence of the counterbalance weight 57. Note that the fulcrum point 62 is the same predetermined distance (e.g., 30 inches) from the lower shaft axis intersection point 58 as in the conventional putter 10.

The $MOI_e$ of the putter 50 can be approximated as the sum of the inertial effect of the head 52 and the inertial effect of the counterbalance weight 57. As described above, the inertial effect of the head 52 can be approximated as $N_2*X_1^2$, where "$N_2$" is the mass of the head 52. Similarly, the inertial effect of the counterbalance weight 57 can be approximated as $N_3*X_2^2$, where "$N_3$" is the mass of the counterbalance weight 57 and "$X_2$" is the distance from the center 66 of the counterbalance weight to the grip fulcrum point 62, as shown in FIG. 5. Thus, the $MOI_e$ of the putter 50 can be approximated as the sum of $(N_2*X_1^2)+(N_3*X_2^2)$. The $MOI_{CG}$ of the putter can be approximated in a similar manner using analogous dimensions from the mass centers 64 and 66 to the CG. The $MOI_e$ and $MOI_{CG}$ of the putter 50 will therefore be greater than the $MOI_e$ and $MOI_{CG}$ of the conventional putter 10 if the mass of their heads are equal or if the mass of the head 52 of putter 50 is greater than the mass of the head 12 of putter 10. The greater $MOI_e$ and/or greater $MOI_{CG}$ of the putter 50 can provide greater swing stability during a putting stroke and can make it more difficult for a golfer to accidentally adjust the swing path of the putter when it is in motion. This lessens the effect of problems such as "the yips" or too much wrist action during the putting stroke and gives the golfer more consistent, predictable putting.

While the increase in $MOI_e$ and/or $MOI_{CG}$ is desirable, it can also be desirable to maintain the same or similar total club mass and/or maintain the same or similar swingweight compared to a conventional putter, such as is represented by the putters 10 and 30. To maintain a similar total mass while adding a substantial counterbalance weight to the butt end of the putter, mass must be subtracted from elsewhere in the putter. For example, the mass of the shaft and/or the mass of the grip can be reduced to accommodate the added mass of a counterbalance weight. In some embodiments, a lightweight shaft can be used instead of a conventional steel putter shaft. For example, the shaft can comprise substantially all graphite and/or other lightweight materials. In another example, a bi-matrix shaft can be used that comprises graphite and/or other lightweight material in an upper portion and steel and/or other strong, deformable material in a lower portion or tip portion to allow the tip portion to be bent to adjust the orientation of the head relative to the shaft axis. In some example, a steel tip can be provided to allow plastic bending of the tip to adjust the orientation of the head. In other examples, the lower portion of the shaft can comprise a composite material, such as CFE composites, that can be pre-bend or pre-shaped during manufacturing to provide for a desired orientation of the head. In still other embodiments, the shaft can comprise a non-uniform distribution of materials. For example, the material distribution in the shaft can be skewed to provide greater density in a desire region of the shaft, such as at the butt end and/or at the lower end or tip. This can be accomplished, for example, by embedding or molding high density materials, or discrete weights, into a lower density substrate material during construction of the shaft. In one embodiment, the counterbalance weight added to the butt end of the shaft may be a part or portion of the shaft that is integral with the rest of the shaft, instead of a separate component that is attached to or coupled to the shaft.

The grip can also be comprised of lightweight material and/or can be reduced in volume to reduce its mass contribution to the putter. By reducing the mass of the shaft and/or grip by an amount about equal to the mass added by the counterbalance weight, the overall mass of the putter can be maintained about the same compared to a conventional putter. In some embodiments, the grip can have a non-uniform density distribution in order to provide greater density toward the butt end of the shaft and lower density at the lower end of the grip.

However, reducing the mass of the shaft and/or grip and redistributing that mass to the butt end of the putter in the form of a counterbalance weight can shift the CG of the club upwardly along the shaft axis toward the butt end of the putter, which can change the swingweight of the putter a significant amount. For example, shifting mass toward the butt end of the putter can shift the CG closer to the grip fulcrum point and thus reduce the swingweight of the putter. With reference to FIGS. 4 and 5, such a shift in the CG can correspond to the distance "$d_2$" being greater than the distance "$d_1$". Since significantly changing the swingweight of the putter compared to a conventional putter may be undesirable, some of the mass savings from reducing the mass of the shaft and/or grip can be added to the putter head (and/or to the lower end of the shaft), in addition to the counterbalance weight at the butt end. By redistributing some mass to the head and some mass to the butt end, the overall effect on the CG and thus on the swingweight can be minimal ("$d_2$" can be the about the same as or similar to "$d_1$"), while still maintaining a similar total mass and still providing an increase in $MOI_e$ and $MOI_{CG}$. The mass of the counterbalance weight still provides an increase in the MOI of the putter, and adding mass to the head also increases the head's contribution to the MOI of the putter.

The counterbalance weight 57 can comprise any dense material, can have any shape, and can be coupled to the shaft and/or grip in any manner. In some embodiments, the counterbalance weight may be part or and/or integral with the shaft or the grip. In some embodiments, the counterbalance weight can be adjustable and/or removable. In some embodiments, two or more counterbalance weights can be provided to allow a user to select which one to couple to the putter. For example, the different counterbalance weights can have different masses, different shapes, different lengths, and/or different aesthetic appearances. A person may be able to remove one weight from the shaft and attach another weight to the shaft to change the characteristics of the putter. In some embodiments, two or more counterbalance weights may be attached to the putter at the same time, such as one on top of the other or side-by-side, etc. For example, a first weight may attach to the shaft and a second weight may attach to the first weight. In some embodiments, the different weights can appear identical, but have different masses (e.g., different materials and/or hollow regions). In some embodiments, the counterbalance weights can require a tool to be removed from the putter or to be secured to the putter, while in other embodiments no tool is required. When attached to the putter, the interchangeable counterbalance weights may be non-adjustable or may be adjustable.

In embodiments where a counterbalance weight is adjustable to be attached to the putter in different positions, the axial position of the counterbalance weight relative to the shaft and/or grip may be adjusted. For example, the counterbalance weight may be adjustable along the shaft axis by rotating the counterbalance weight relative to the shaft. A threaded attachment with the shaft may be used, for example. In some embodiments, the positional adjustability can be limited to a group of discrete positional settings, rather than a continuous or analog range of positions. In such embodiments, the weight can be fixable at each of the discrete positional settings, such as by using a tool to tighten a set screw or the like.

Figure 6:
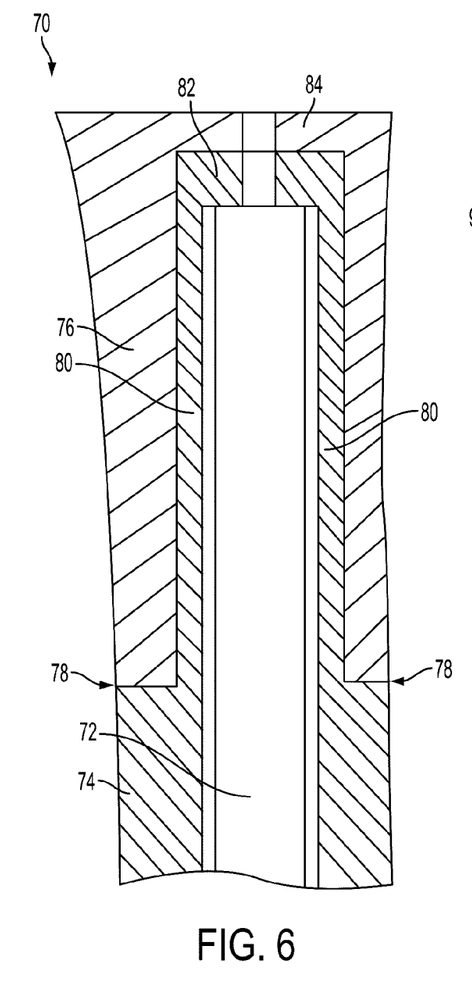
FIG. 6 is a cross-sectional view of a butt end of an exemplary putter having a counterbalance weight positioned at the top end of a hand grip and having a radial outer surface that is substantially contiguous with a radial outer gripping surface of the hand grip.
Figure 7:
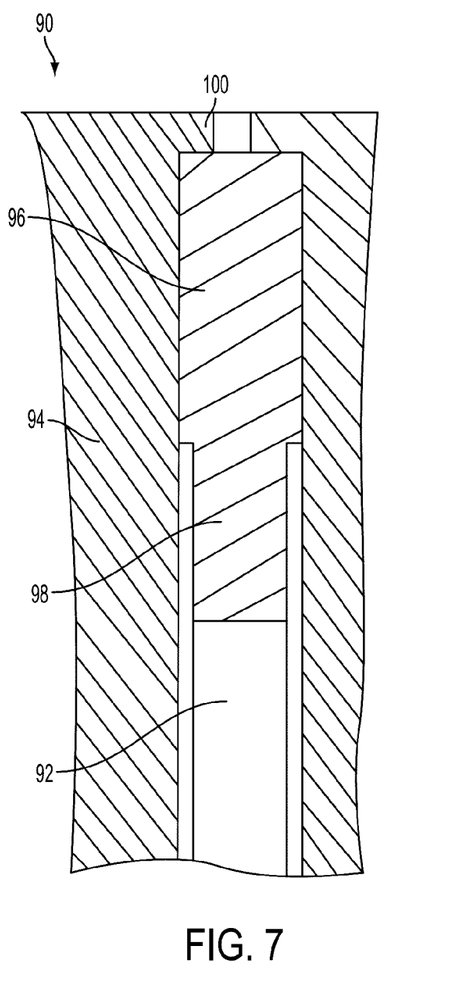
FIG. 7 is a cross-sectional view of a butt end of another exemplary putter having a counterbalance weight positioned within the top end of the hand grip and secured to the top end of the putter shaft.

FIGS. 6 and 7 are cross-sections of exemplary butt ends of putters that include a counterbalance weight. FIG. 6 shows a putter 70 that comprises a shaft 72, a grip 74 mounted around the top end of the shaft, and an external counterbalance weight 76 mounted around the top end of the grip. In this example, the grip 74 includes a thin or narrowed upper portion 80 and a top portion 82 that extends around the top end of the shaft 72. The counterbalance weight 76 has a recess that receives the upper portion 80 and top portion 82 of the grip. The counterbalance weight 76 can have a top portion 84 that covers the top portion 82 of the grip and forms the upper surface of the putter 70. The grip can be secured to the shaft with an adhesive or other means, and the counterbalance weight can be secured to the grip with an adhesive or other means.

A counterbalance weight can have a radial outer surface that is substantially contiguous with and/or blends into the radial outer gripping surface of the grip, such that a smooth transition is formed at an annular joint 78 (see FIG. 6) between the radial outer surfaces of the grip and the weight. In some embodiments, the appearance of the grip and the weight can be similar such that the transition at the joint 78 is minimally noticeable visually or tactiley, while in other embodiments, they may have different colors or finishes such that the transition at the joint 78 is visually noticeable but minimally noticeable by feel. As shown in FIG. 6, the counterbalance weight may increase in diameter or width moving upwardly from the joint 78. This can provide more volume and mass per vertical length of the counterbalance weight.

FIG. 7 is a cross-sectional side view of the butt end of another exemplary putter 90 that has an internal counterbalance weight 96. The putter 90 comprises a shaft 92, the counterbalance weight 96 mounted to the top end of the shaft, and a grip 94 mounted around the top end of the shaft and covering the counterbalance weight, including a grip top portion 100 positioned over the top of the weight 96. The weight 96 includes a lower portion 98 that is inserted into and secured to the top end of the shaft, such as by threads, friction fit, welding, adhesive, etc. In this embodiment, the entire outer surface of the butt end of the putter 90 is provided by the grip 94. The weight 96 can have about the same diameter as the shaft 92, such that the weight effectively extends the length of the shaft.

In any of the embodiments disclosed herein, the counterbalance weight can have any axial length, provided the width and density of it are sufficient to provide the desired mass addition to the butt end of the putter. In some circumstances, it may be undesirable for the butt end of a putter to extend too far above the golfer's hands. For example, rules may prohibit the butt end of the putter from contacting or being anchored to the golfer's torso or other body portion other than the hands. Thus, a shorter counterbalance weight can be desirable. To provide a maximum mass per axial length added to the putter, the counterbalance weight can be made wider (e.g., as wide as the grip or wider) and can be made from a relatively dense material, such as steel, tungsten, or other dense metals. In some embodiments, the axial length of the counterbalance weight is less than four inches, less than 3 inches, less than 2 inches, and/or less than 1 inch. The overall length "L" of a putter as described herein including a counterbalance weight can be less than or equal to 45 inches, less than or equal to 40 inches, less than or equal to 39 inches, less than or equal to 38 inches, less than or equal to 37 inches, and/or less than or equal to 36 inches.

As described elsewhere herein, some putters having a counterbalance weight at the butt end can also include added mass in the putter head to maintain a familiar swingweight relative to a conventional putter. The mass added to the putter head can be added in any manner. In some embodiments, one or more adjustable and/or removable weights can be coupled to the putter head. Such weights may be removable and interchangeable with other weights having different masses. In other embodiments, the size and/or materials of the putter head may be changed to increase the mass of the putter head a desired amount. More information regarding exemplary putter heads and adjustable/removable putter head weights can be found in U.S. Pat. No. 8,328,654, which is incorporated by reference herein in its entirety.

The disclosed counterbalanced putters can have any overall mass, though in some embodiments the overall mass of the putter, including any weights, can be between about 450 grams and about 800 grams, between about 500 grams and about 750 grams, and/or between about 600 grams and about 700 grams.

The counterbalance weight itself can also have any mass, though in some embodiments the mass of the counterbalance weight is at least 50 grams, at least 100 grams, at least 125 grams, and/or at least 150 grams.

Similarly, in embodiments wherein the putter head includes added mass, the added mass, whether in the form of one or more weights movable relative to the head body or increased mass of the head body, can be at least 5 grams, at least 10 grams, at least 12.5 grams, and/or at least 15 grams. The overall mass of the putter head, including any weights, can be any mass, such as at least 200 grams, at least 300 grams, at least 350 grams, at least 355 grams, at least 360 grams, and/or at least 365 grams. In one particular example, the putter head has a total mass of about 365 grams, including added mass in the form of one or more weights that have a mass of about 15 grams to offset a butt end counterbalance weight having a mass of 150 grams.

The shaft can have any mass, such as 130 grams or less, 100 grams or less, 80 grams or less, 70 grams or less, and/or 60 grams or less. In one particular example, a bi-matrix shaft is included that has a graphite upper portion with a mass of about 50 grams and a steel lower portion with a mass of about 20 grams, providing a total of about 70 grams.

The grip can also have any mass, such as 100 grams or less, 50 grams or less, 40 grams or less, and/or 35 grams or less. In some embodiments, the grip comprises a lightweight EVA material.

The total mass of the shaft and grip together can be lower than in a conventional putter, such as less than 200 grams, less than 150 grams, less than 125 grams, less than 110 grams, and/or less than 100 grams.

The disclosed counterbalance putters can have any $MOI_{CG}$, such as at least 800 kg*cm$^2$, at least 900 kg*cm$^2$, at least 950 kg*cm$^2$, at least 980 kg*cm$^2$, at least 1000 kg*cm$^2$, and/or at least 1100 kg*cm$^2$. Similarly, the disclosed counterbalance putters can have any $MOI_e$ (with e=30 inches), such as at least 2000 kg*cm$^2$, at least 2100 kg*cm$^2$, at least 2200 kg*cm$^2$, at least 2300 kg*cm$^2$, at least 2400 kg*cm$^2$, and/or at least 2450 kg*cm$^2$.

Another meaningful parameter type for putters are ratios of a club moment of inertia divided by the club length squared ($L^2$). For example, the ratio $MOI_{CG}$ per unit length$^2$ (in units of kg*cm$^2$/inch$^2$) for the disclosed counterbalance putters can be at least 0.60, at least 0.65, at least 0.70, at least 0.75, at least 0.76, at least 0.77, and/or at least 0.78.

Still another meaningful parameter type for putters is the ratio of the $MOI_{CG}$ per unit length$^2$ divided by the total club mass. This parameter can be expressed in terms of a unitless percentage and can be referred to as inertial efficiency since it represents how effective the mass and length of the putter are utilized to maximize the $MOI_{CG}$. The disclosed counterbalance putters can have an inertial efficiency of at least 17%, at least 18%, at least 18.5%, at least 18.6%, at least 18.7%, at least 18.8%, at least 18.9%, at least 19%, and/or at least 19.1%.

The disclosed counterbalance putters can have a swingweight that is similar to a conventional putter having the same mass. For example, the disclosed counterbalance putters can have a swingweight (with e=30 inches) of less than 3.4 N*m, less than 3.0 N*m, between 2.5 N*m and 3.2 N*m, between 2.6 N*m and 3.4 N*m, between 2.6 N*m and 3.0 N*m, and/or greater than 2.6 N*m.

Figure 8:
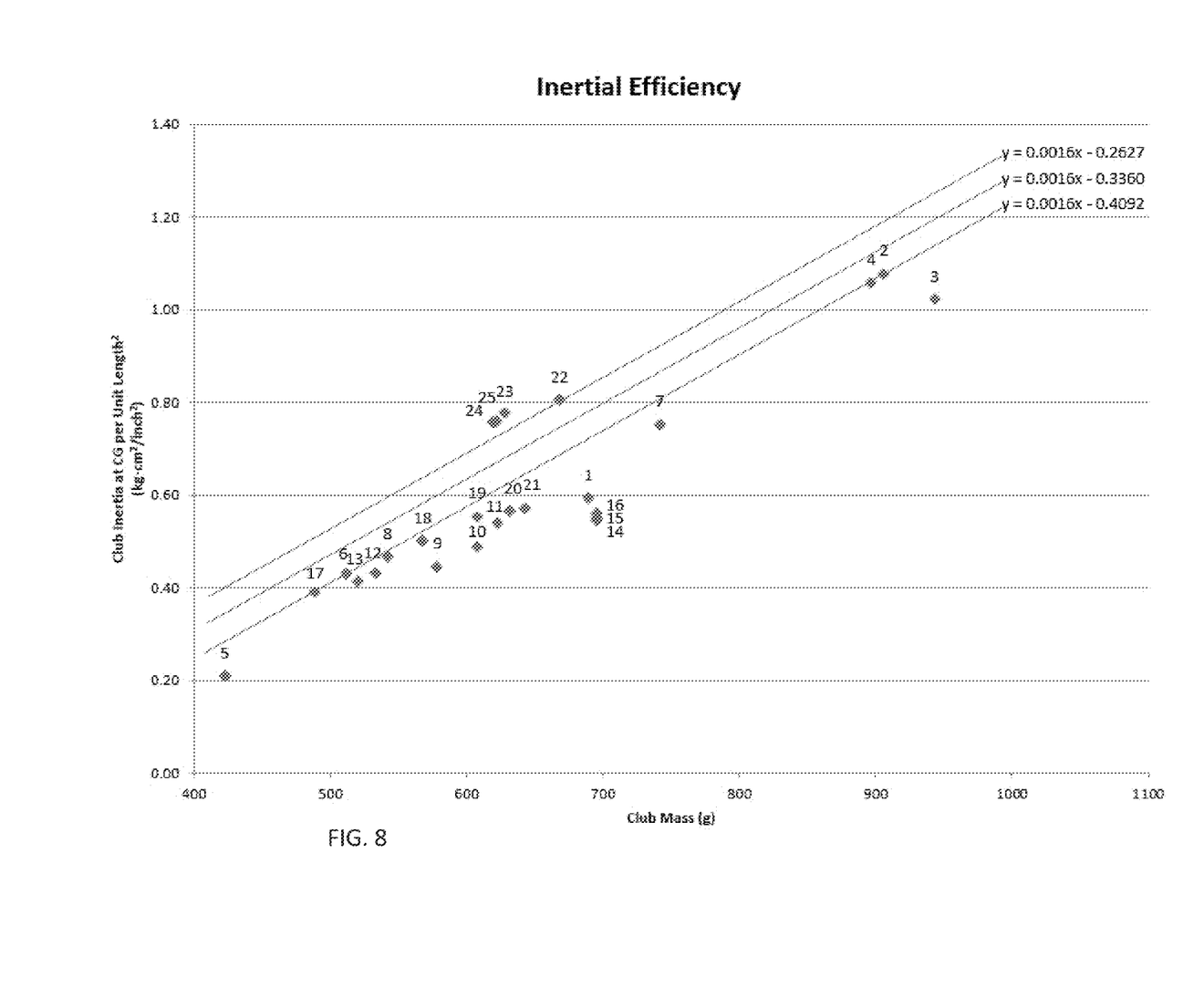
FIG. 8 is a graph that illustrates inertial efficiency for several exemplary putters.
Figure 9:
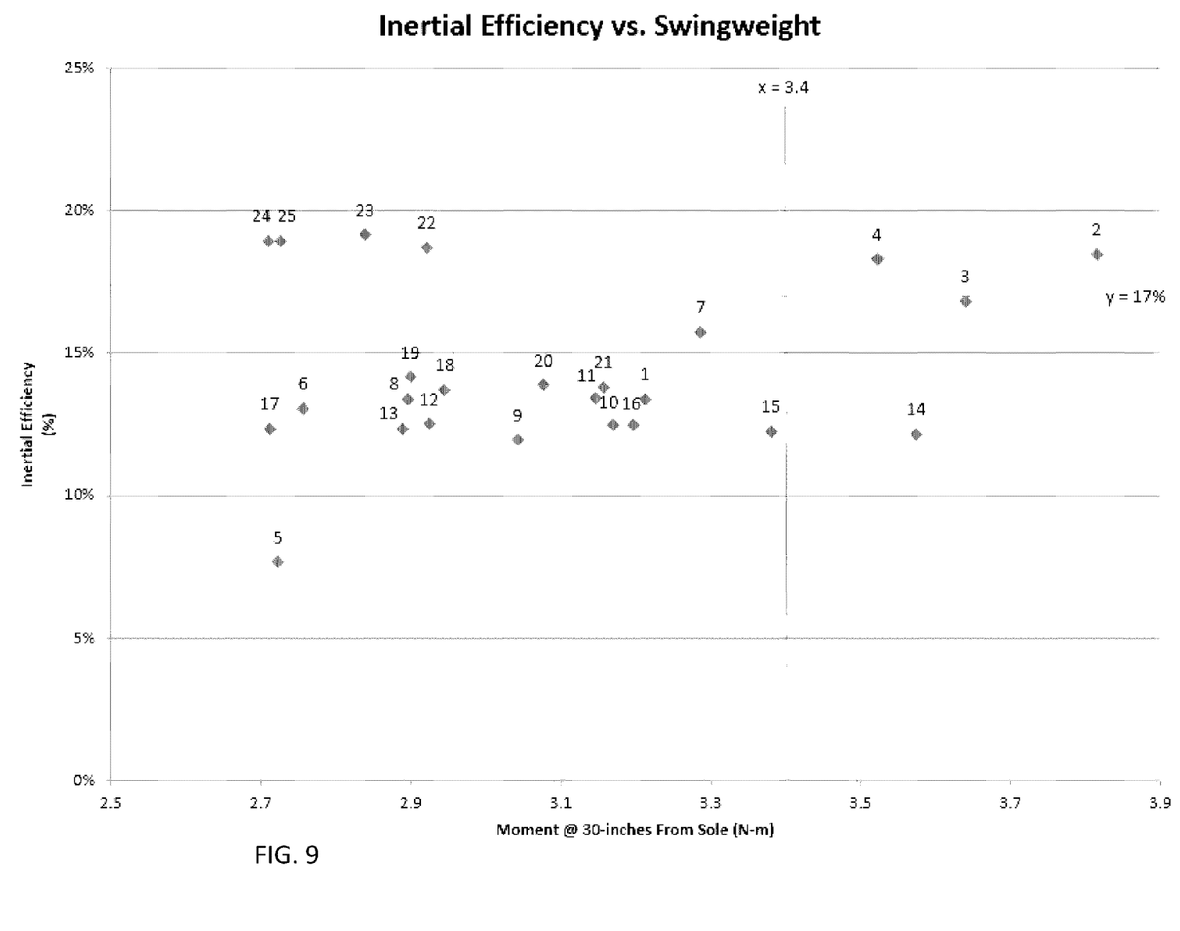
FIG. 9 is a graph that illustrates inertial efficiency versus swing weight for several exemplary putters.

Table 1 below provides representative data for 25 different exemplary putters. Putters 22-25 are exemplary embodiments of counterbalanced putters as described herein. FIGS. 8 and 9 illustrate some of the relationships among the putters listed in Table 1.

TABLE 1

| Putter | Club Length (in) | Club Mass (g) | Club Inertia at CG (kg*cm$^2$) | Inertia per Unit Length$^2$ (kg*cm$^2$/in$^2$) | Inertial Efficiency (unitless) | Swing-weight (N*m) |
|---|---|---|---|---|---|---|
| 1 | 40 | 689 | 954 | 0.59 | 13.4 | 3.21 |
| 2 | 34 | 906 | 1256 | 1.08 | 18.5 | 3.82 |
| 3 | 39 | 943 | 1557 | 1.02 | 16.8 | 3.64 |
| 4 | 35 | 897 | 1297 | 1.06 | 18.3 | 3.52 |
| 5 | 35 | 423 | 257 | 0.21 | 7.7 | 2.72 |
| 6 | 35 | 512 | 530 | 0.43 | 13.1 | 2.76 |
| 7 | 38 | 742 | 1080 | 0.75 | 15.7 | 3.29 |
| 8 | 35 | 542 | 572 | 0.47 | 13.4 | 2.90 |
| 9 | 38 | 579 | 644 | 0.45 | 11.9 | 3.04 |

TABLE 1-continued

| Putter | Club Length (in) | Club Mass (g) | Club Inertia at CG (kg*cm$^2$) | Inertia per Unit Length$^2$ (kg*cm$^2$/in$^2$) | Inertial Efficiency (unitless) | Swing-weight (N*m) |
|---|---|---|---|---|---|---|
| 10 | 38 | 608 | 706 | 0.49 | 12.5 | 3.17 |
| 11 | 38 | 623 | 781 | 0.54 | 13.5 | 3.15 |
| 12 | 35 | 533 | 530 | 0.43 | 12.5 | 2.92 |
| 13 | 35 | 520 | 511 | 0.41 | 12.3 | 2.89 |
| 14 | 34 | 696 | 794 | 0.55 | 12.2 | 3.57 |
| 15 | 38 | 696 | 794 | 0.55 | 12.2 | 3.38 |
| 16 | 42 | 696 | 989 | 0.56 | 12.5 | 3.20 |
| 17 | 36 | 489 | 502 | 0.39 | 12.4 | 2.71 |
| 18 | 35 | 568 | 615 | 0.50 | 13.7 | 2.95 |
| 19 | 38 | 608 | 801 | 0.55 | 14.2 | 2.90 |
| 20 | 38 | 632 | 816 | 0.57 | 13.9 | 3.08 |
| 21 | 38 | 643 | 829 | 0.57 | 13.8 | 3.16 |
| 22 | 38 | 668 | 1164 | 0.81 | 18.7 | 2.92 |
| 23 | 36 | 628 | 981 | 0.78 | 19.1 | 2.84 |
| 24 | 36 | 620 | 988 | 0.76 | 18.9 | 2.71 |
| 25 | 36 | 622 | 985 | 0.76 | 18.9 | 2.73 |

FIG. 8 illustrates the inertial efficiency of the putters in Table 1 by plotting $MOI_{CG}$ per unit length squared on the y-axis and plotting total club mass on the x-axis. As shown, the putters 22-25 have greater inertial efficiency that the other sample putters 1-21. FIG. 8 includes three parallel lines that represent various levels of $MOI_{CG}$ per unit length squared as a function of total mass. The lower line represents the function y=0.0016x−0.4092, the middle line represents the function y=0.0016x−0.3360, and the upper line represents the function y=0.0016x−0.2627. As shown, the putters 22-25 all satisfy the related inequalities y>0.0016x−0.4092, y>0.0016x−0.3360, and y>0.0016x−0.2627, while none of the other putters 1-21 satisfy any of those three inequalities.

FIG. 9 compares the inertial efficiency of the putters in Table 1 to their swingweight by plotting inertial efficiency as a unitless percentage on the y-axis and plotting swingweight (in N*m as measured at e=30") on the x-axis. As shown, the putters 22-25 all have an inertial efficiency that is greater than 17% and a swingweight that is less than 3.4 N*m, while none of the other putters 1-21 have both of these features. FIGS. 8 and 9 illustrate how the disclosed counterbalanced putters can provide increased MOI while maintaining a familiar mass and a familiar swingweight, while other putters have a high MOI but also an abnormally high or low total mass and/or an abnormally high swingweight.

Exemplary Materials

The components of the embodiments disclosed herein can be formed from any of various suitable metals, metal alloys, polymers, composites, or various combinations thereof.

In addition to those noted elsewhere herein, examples of metals and metal alloys that can be used to form the components include, without limitation, carbon steels (e.g., 1020 or 8620 carbon steel), stainless steels (e.g., 304 or 410 stainless steel), PH (precipitation-hardenable) alloys (e.g., 17-4, C450, or C455 alloys), titanium alloys (e.g., 3-2.5, 6-4, SP700, 15-3-3-3, 10-2-3, or other alpha/near alpha, alpha-beta, and beta/near beta titanium alloys), aluminum/aluminum alloys (e.g., 3000 series alloys, 5000 series alloys, 6000 series alloys, such as 6061-T6, and 7000 series alloys, such as 7075), magnesium alloys, copper alloys, nickel alloys, and tungsten.

Examples of composites that can be used to form the components include, without limitation, glass fiber reinforced polymers (GFRP), carbon fiber reinforced polymers (CFRP), metal matrix composites (MMC), ceramic matrix composites (CMC), and natural composites (e.g., wood composites).

Examples of polymers that can be used to form the components include, without limitation, thermoplastic materials (e.g., polyethylene, polypropylene, polystyrene, acrylic, PVC, ABS, polycarbonate, polyurethane, polyphenylene oxide (PPO), polyphenylene sulfide (PPS), polyether block amides, nylon, and engineered thermoplastics), thermosetting materials (e.g., polyurethane, epoxy, and polyester), copolymers, and elastomers (e.g., natural or synthetic rubber, EPDM, and Teflon®).

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following exemplary claims. We therefore claim all that comes within the scope of the following claims.

The invention claimed is:

1. A putter comprising:
   a putter head;
   a shaft having an upper end and a lower end that is coupled to the putter head;
   a hand grip coupled to the shaft between the upper end and the lower end; and
   a counterbalance weight coupled to the upper end of the shaft;
   wherein the putter satisfies the following inequality:

$$y > 0.0016x - 0.4092$$

where "y" is the putter's inertia at the putter's CG per unit length squared, measured in units of kg*cm$^2$/inch$^2$, and "x" is the putter's total mass measured in grams.

2. The putter of claim 1, wherein y>0.0016x−0.3360.

3. The putter of claim 1, wherein y>0.0016x−0.2627.

4. The putter of claim 1, wherein the putter's total mass is between 450 grams and 800 grams.

5. The putter of claim 1, wherein the counterbalance weight has a mass of at least 100 grams.

6. The putter of claim 1, wherein the putter has a swingweight that is less than 3.4 N*m with the distance "e" being 30 inches.

7. The putter of claim 1, wherein the putter has a swingweight that is between 2.6 N*m and 3.0 N*m with the distance "e" being 30 inches.

8. The putter of claim 1, wherein the counterbalance weight is removably coupled to the upper end of the shaft, or is positionally adjustable relative to the shaft.

9. The putter of claim 1, wherein the putter head includes a head weight that is removable or adjustable relative to a main body of the putter head, and the head weight has a mass that is selected based on the mass of the counterbalance weight in order to provide a familiar swingweight.

10. The putter of claim 1, wherein the hand grip has an outer gripping surface and the counterbalance weight has an outer surface, and the counterbalance weight is positioned above the hand grip such that the outer surface of the counterbalance weight is substantially contiguous with the outer gripping surface of the hand grip.

11. The putter of claim 1, wherein the shaft comprises an upper portion coupled to the hand grip and the counterbalance weight, and a lower portion coupled to the putter head, and the upper portion of the shaft is less dense than the lower portion of the shaft.

12. A putter comprising:
   a putter head;
   a shaft having an upper end and a lower end that is coupled to the putter head;

a hand grip coupled to the shaft between the upper end and the lower end; and a counterbalance weight coupled to the upper end of the shaft;

wherein the putter satisfies the following inequalities:

y>17%, and x<3.4 where "y" is the putter's inertial efficiency in unitless percentage, and "x" is the putter's swingweight measured in N*m with the distance "e" being 30 inches.

13. The putter of claim 12, wherein 2.5<x<3.2.
14. The putter of claim 12, wherein 2.6<x<3.0.
15. The putter of claim 12, wherein y>18.6%.
16. The putter of claim 12, wherein the putter's total mass is between 500 grams and 750 grams and the counterbalance weight has a mass of at least 100 grams.
17. The putter of claim 12, wherein the counterbalance weight is removably coupled to the upper end of the shaft, or is positionally adjustable relative to the shaft.
18. The putter of claim 12, wherein the putter head includes a removable weight or an adjustable weight.
19. The putter of claim 12, wherein the hand grip has a radial outer gripping surface and the counterbalance weight has a radial outer surface, and the counterbalance weight is positioned above the hand grip such that the radial outer surface of the counterbalance weight is substantially contiguous with the radial outer gripping surface of the hand grip.
20. The putter of claim 12, wherein the shaft comprises upper portion coupled to the hand grip and the counterbalance weight, and a lower portion coupled to the putter head, and the upper portion of the shaft is less dense than the lower portion of the shaft.

* * * * *